United States Patent [19]

Chung et al.

[11] Patent Number: 5,471,557
[45] Date of Patent: Nov. 28, 1995

[54] SPEECH RECOGNITION SYSTEM UTILIZING A NEURAL NETWORK

[75] Inventors: Ho-sun Chung; Soo-yong Lee, both of Taegu, Rep. of Korea

[73] Assignee: Gold Star Electron Co., Ltd., Cheongju-city, Rep. of Korea

[21] Appl. No.: 112,037

[22] Filed: Aug. 26, 1993

[30] Foreign Application Priority Data

Aug. 27, 1992 [KR] Rep. of Korea .................. 92-15484

[51] Int. Cl.$^6$ .................. G10L 5/06; G10L 9/00
[52] U.S. Cl. .................. 395/2.41; 395/2.43; 395/2.4; 395/2; 395/2.84
[58] Field of Search .................. 381/36–53; 395/2, 395/2.1–2.87, 20–27

[56] References Cited

U.S. PATENT DOCUMENTS

| | | | |
|---|---|---|---|
| 4,907,274 | 3/1990 | Nomura et al. | 395/2.79 |
| 5,086,479 | 2/1992 | Takenaga et al. | 395/22 |
| 5,136,653 | 8/1992 | Kumagai et al. | 381/43 |
| 5,175,799 | 12/1992 | Shimura | 395/2 |
| 5,191,635 | 3/1993 | Fujimoto | 395/2 |
| 5,214,745 | 5/1993 | Sutherland | 395/22 |

OTHER PUBLICATIONS

Ambikairajah et al, "A speaker verification system based on a neural prediction model"; Communications on the Move. Signapore. ICCS/ISITA '92, pp. 419–422 vol. 2, 16–20 Nov. 1992.

Botros et al, "Speech recogntion using dynamic neural networks"; IJCNN International Joint Conference on Neural Networks, pp. 737–742 vol. 4, 7–11 Jun. 1992.

Zhao, "Connectionist training of non–linear hidden Markov models for speech recognition"; 1991 IEEE International Joint Conference on Neural Networks, pp. 1647–1652 vol. 2, 18–21 No. 1991.

*Primary Examiner*—Robert W. Downs
*Assistant Examiner*—Tariq Hafiz
*Attorney, Agent, or Firm*—Rothwell, Figg, Ernst & Kurz

[57] ABSTRACT

A speech recognition system for recognizing the remote-controlling vocal commands of TV sets and VCRs comprises a microphone for receiving the speech pronounced by a user; a speech analyzer for analyzing the speech input via the microphone; circuitry for detecting a vocal section of the speech from the speech analyzer and performing a time-axis normalization and a binarization for the detected vocal section; and a multilayer neural network for receiving the binarization data from the aforementioned circuitry and then performing the learning, to thereby output the speech recognition result. Accordingly, the present invention can enhance the recognition ratio of speech.

5 Claims, 11 Drawing Sheets

| F1 | F2 | F3 | F4 | F5 | F6 | F7 | F8 | F9 | F10 | F11 | F12 | F13 | F14 | F15 | F16 | TOTAL ENERGY | FRMAE |
|---|---|---|---|---|---|---|---|---|---|---|---|---|---|---|---|---|---|
| 9 | 9 | 0 | 3 | 6 | 4 | 3 | 0 | 1 | 6 | 3 | 15 | 49 | 52 | 44 | 19 | 223 | 1 |
| 162 | 197 | 95 | 47 | 34 | 23 | 25 | 24 | 11 | 13 | 38 | 34 | 28 | 17 | 19 | 11 | 778 | 2 |
| 79 | 132 | 68 | 24 | 28 | 24 | 33 | 23 | 4 | 4 | 15 | 12 | 12 | 10 | 9 | 4 | 481 | 3 |
| 43 | 44 | 36 | 24 | 17 | 30 | 24 | 26 | 4 | 5 | 3 | 3 | 4 | 6 | 1 | 0 | 270 | 4 |
| 99 | 121 | 45 | 54 | 22 | 25 | 13 | 9 | 6 | 8 | 6 | 8 | 2 | 6 | 1 | 5 | 430 | 5 |
| 101 | 90 | 86 | 51 | 54 | 25 | 43 | 32 | 31 | 25 | 15 | 16 | 12 | 12 | 12 | 9 | 614 | 6 |
| 136 | 126 | 99 | 65 | 70 | 52 | 31 | 26 | 28 | 15 | 16 | 13 | 15 | 16 | 8 | 6 | 722 | 7 |
| 125 | 143 | 127 | 71 | 70 | 61 | 32 | 18 | 17 | 20 | 14 | 12 | 16 | 10 | 8 | 8 | 752 | 8 |
| 108 | 127 | 122 | 77 | 63 | 63 | 40 | 19 | 19 | 19 | 13 | 18 | 10 | 15 | 15 | 9 | 737 | 9 |
| 97 | 100 | 101 | 56 | 49 | 47 | 48 | 17 | 28 | 21 | 15 | 16 | 10 | 11 | 10 | 8 | 634 | 10 |
| 101 | 100 | 93 | 48 | 46 | 41 | 52 | 15 | 27 | 21 | 13 | 15 | 11 | 11 | 10 | 10 | 614 | 11 |
| 105 | 89 | 91 | 52 | 44 | 34 | 44 | 18 | 24 | 16 | 12 | 15 | 10 | 11 | 10 | 7 | 582 | 12 |
| • | • | • | • | • | • | • | • | • | • | • | • | • | • | • | • | • | • |
| 110 | 86 | 92 | 50 | 52 | 39 | 35 | 14 | 18 | 14 | 11 | 15 | 11 | 10 | 10 | 8 | 575 | 19 |
| 91 | 95 | 93 | 64 | 57 | 28 | 20 | 15 | 13 | 9 | 3 | 5 | 5 | 6 | 4 | 4 | 512 | 20 |
| 87 | 105 | 56 | 55 | 50 | 42 | 25 | 13 | 10 | 14 | 10 | 7 | 6 | 4 | 3 | 2 | 490 | 21 |
| 118 | 85 | 113 | 83 | 58 | 45 | 22 | 13 | 4 | 8 | 4 | 7 | 5 | 7 | 5 | 4 | 581 | 22 |
| 157 | 104 | 118 | 64 | 82 | 73 | 51 | 49 | 28 | 31 | 28 | 23 | 17 | 12 | 18 | 8 | 863 | 23 |
| 217 | 146 | 206 | 101 | 40 | 65 | 51 | 34 | 21 | 28 | 15 | 21 | 9 | 10 | 13 | 9 | 986 | 24 |
| 230 | 104 | 179 | 58 | 41 | 55 | 34 | 27 | 8 | 18 | 10 | 9 | 12 | 14 | 9 | 7 | 815 | 25 |
| 236 | 112 | 119 | 52 | 31 | 28 | 24 | 22 | 10 | 4 | 9 | 6 | 5 | 7 | 8 | 3 | 676 | 26 |
| 219 | 106 | 84 | 42 | 23 | 22 | 16 | 13 | 4 | 4 | 8 | 9 | 8 | 7 | 3 | 6 | 574 | 27 |
| 158 | 54 | 31 | 16 | 14 | 12 | 9 | 3 | 2 | 3 | 3 | 5 | 2 | 6 | 0 | 0 | 318 | 28 |
| 125 | 26 | 6 | 3 | 9 | 6 | 2 | 1 | 0 | 0 | 2 | 1 | 2 | 3 | 0 | 0 | 186 | 29 |
| 103 | 20 | 6 | 2 | 7 | 8 | 1 | 5 | 3 | 3 | 1 | 1 | 0 | 2 | 0 | 0 | 162 | 30 |

| F1 | | | | | | | — | | | | | | F15 | | frame |
|---|---|---|---|---|---|---|---|---|---|---|---|---|---|---|---|
| 0 | 0 | 1 | 1 | 0 | 0 | 1 | 0 | 0 | 1 | 1 | 0 | 1 | 0 | | 1 |
| 0 | 1 | 0 | 0 | 1 | 0 | 0 | 0 | 1 | 0 | 1 | 1 | 0 | 0 | 0 | 2 |
| 0 | 0 | 1 | 0 | 0 | 1 | 1 | 0 | 0 | 1 | 1 | 1 | 0 | 0 | 0 | 3 |
| 1 | 0 | 0 | 0 | 1 | 1 | 0 | 0 | 1 | 0 | 0 | 1 | 1 | 0 | 0 | 4 |
| 1 | 0 | 0 | 0 | 0 | 0 | 0 | 0 | 0 | 1 | 1 | 0 | 0 | 0 | 0 | 5 |
| 1 | 0 | 0 | 1 | 0 | 0 | 0 | 1 | 0 | 0 | 1 | 0 | 1 | 0 | 0 | 6 |
| 1 | 0 | 1 | 0 | 0 | 0 | 0 | 0 | 0 | 1 | 0 | 1 | 0 | 0 | 0 | 7 |
| 1 | 0 | 0 | 0 | 0 | 0 | 1 | 0 | 0 | 0 | 1 | 0 | 1 | 0 | 0 | 8 |
| 1 | 0 | 0 | 0 | 0 | 0 | 0 | 0 | 1 | 0 | 0 | 0 | 1 | 0 | 0 | 9 |
| 0 | 0 | 0 | 0 | 0 | 0 | 0 | 0 | 0 | 0 | 0 | 0 | 0 | 0 | 1 | 10 |
| • | • | • | • | • | • | • | • | • | • | • | • | • | • | • | |
| 0 | 1 | 0 | 1 | 0 | 0 | 0 | 1 | 0 | 0 | 0 | 0 | 0 | 1 | 0 | 21 |
| 0 | 1 | 0 | 1 | 0 | 0 | 0 | 1 | 0 | 1 | 0 | 0 | 1 | 0 | 0 | 22 |
| 0 | 1 | 0 | 1 | 0 | 0 | 0 | 1 | 0 | 1 | 0 | 1 | 0 | 0 | 0 | 23 |
| 0 | 1 | 0 | 0 | 1 | 0 | 0 | 1 | 0 | 0 | 0 | 1 | 0 | 0 | 0 | 24 |
| 0 | 1 | 0 | 0 | 1 | 0 | 0 | 1 | 0 | 0 | 0 | 1 | 1 | 0 | | 25 |
| 0 | 1 | 0 | 0 | 1 | 0 | 0 | 1 | 0 | 0 | 0 | 0 | 1 | 0 | | 26 |
| 0 | 1 | 0 | 0 | 1 | 0 | 0 | 0 | 0 | 0 | 0 | 0 | 0 | 1 | | 27 |
| 0 | 0 | 0 | 1 | 0 | 0 | 1 | 0 | 0 | 0 | 0 | 1 | 0 | 0 | 0 | 28 |
| 0 | 0 | 0 | 0 | 0 | 0 | 0 | 0 | 1 | 0 | 0 | 0 | 0 | 0 | 0 | 29 |
| 0 | 0 | 0 | 0 | 1 | 1 | 0 | 0 | 1 | 0 | 1 | 0 | 1 | 0 | 0 | 30 |

FIG. 5B

| F1 — F16 | frame |
|---|---|
| 0 0 0 0 0 0 0 0 0 0 0 1 0 0 0 | 1 |
| 0 1 1 0 0 0 0 0 0 0 0 1 1 0 0 | 2 |
| 0 1 0 0 0 0 0 0 0 0 0 1 0 0 0 | 3 |
| 0 1 0 0 0 0 0 0 0 0 0 0 0 0 0 | 4 |
| 0 1 0 0 0 0 0 0 0 0 0 0 0 0 0 | 5 |
| 0 1 0 0 0 0 0 0 0 0 0 0 0 0 0 | 6 |
| 0 1 1 1 1 0 0 0 0 0 0 0 0 0 0 | 7 |
| 0 1 1 1 1 0 0 0 0 0 0 0 0 0 0 | 8 |
| 0 1 1 1 1 0 0 0 0 0 0 0 0 0 0 | 9 |
| 0 1 1 1 1 0 0 0 0 0 0 0 0 0 0 | 10 |
| . . . . . . . . . . . . . . . | . |
| 0 1 1 1 1 1 0 1 0 0 0 0 0 0 0 | 21 |
| 0 1 1 1 1 1 0 1 0 0 0 0 0 0 0 | 22 |
| 0 1 1 1 1 1 0 1 0 0 0 0 0 0 0 | 23 |
| 0 1 1 1 1 1 0 0 0 0 0 0 0 0 0 | 24 |
| 0 1 1 1 0 1 1 0 0 0 0 0 0 0 0 | 25 |
| 0 1 1 1 1 1 0 0 0 0 0 0 0 0 0 | 26 |
| 0 1 1 1 1 1 0 0 0 0 0 0 0 0 0 | 27 |
| 0 0 0 0 0 0 0 0 0 0 0 0 0 0 0 | 28 |
| 0 0 0 0 0 0 0 0 0 0 0 0 0 0 0 | 29 |
| 0 0 0 0 0 0 0 0 0 0 0 0 0 0 0 | 30 |

SPEECH RECOGNITION SYSTEM UTILIZING A NEURAL NETWORK

BACKGROUND OF THE INVENTION

The present invention relates to a speech recognition system, and more particularly to a speech recognition system for recognizing the remote-control vocal commands of household electrical appliances.

The conventional speech recognition system, to recognize speeches spontaneously pronounced by a human being, should perform an enormous amount of calculation for accommodating a variety of speech characteristics. For this reason, the conventional speech recognition system has a drawback in practicability and appropriateness, but cannot facilitate a real-time speech recognition. Therefore, a neural network model has been suggested for solving the problems encountered in pattern recognition, e.g., speech recognition.

In the field of pattern recognition such as speech recognition, several models of neural networks have been suggested. Among these models, a multilayer perceptron is widely used. However, the multilayer perceptron has some drawbacks that it runs into the local minima in learning, at which the error value gradually decreases and again increases, to thereby determine the error value to be a true solution, and that the learning time is too long. Also, the hardware construction is hard to realize, so that it cannot be realized for further applications.

SUMMARY OF THE INVENTION

An object of the present invention is to provide a speech recognition system for recognizing the remote-control commands of the household electrical appliances, by adopting a multilayer neural network which can minimize errors.

To accomplish the above object, the present invention provides a speech recognition system for recognizing the remote-control commands of the household electrical appliances, the system comprising a microphone for receiving the speech pronounced by a user; a speech analyzing for analyzing the speech input via the microphone; a detector for detecting a vocal section of the speech output from the speech analyzing and performing a time-axis normalization and a binarization for the vocal section; and a multilayer neural network for receiving the binarization data from the aforementioned means and then performing the learning with respect to the data, to thereby output the speech recognition result.

BRIEF DESCRIPTION OF THE DRAWINGS

These and other objects, features, aspects and advantages of the present invention will become more apparent from the following detailed description of the present invention when taken in conjunction with the accompanying drawings, in which.

DETAILED DESCRIPTION OF THE INVENTION

Prior to describing of the speech recognition system according to the present invention in reference with the attached drawings, the learning algorithm of the multilayer neural network which is applied to the present invention is to described. The algorithm proceeds as follows:

a) Initialize the weights of all nodes.

b) Provide the values of input and its corresponding output.

c) Sum up the multiplications of input times weights at every node, thus produce an output by using a hard-limit non-linear function:

$$f_h(x) = 1 : x > 0 \quad (1)$$
$$f_h(x) = -1 : x \leq 0$$

$$OUT_j = \left( f_h \left( \sum_{i=0}^{N-1} W_{ji} X_i \right) \right) \quad (2)$$

where $f_h$ is a hard-limit function, $X_i$ is the ith input, $W_{ji}$ is the weight between ith node and jth node, and OUTj is the output value at jth node.

d) Compare the output at the output node with the desired output value, to thereby calculate the error between two of them, and then store the weight changes according to the error values:

$$\Delta W_{ji} = (D_j - O_j) \quad (3)$$

wherein $\Delta W_{ji}$ is a change of weight, $D_j$ is the desired output value of jth node, and $O_j$ is the output value of jth node.

e) Perform steps b) through d) with respect to all of inputs, and then if all of output values are identical to the desired values, stop the learning. Otherwise, add the sum of weight changes to the weight:

$$W_{Tji} = W_{(T-1)ji} + \sum_{i=0}^{N-1} \Delta W_{ji} \quad (4)$$

wherein $W_{(T-1)ji}$ is the weight prior to being changed and $W_{ji}$ is the weight after the change.

f) Repeat steps b) through e) a predetermined number of times, then unless the desired result is obtained, increase the number of layers. Next, repeat steps b) through e) while receiving the output from the preceding layer and the initial input as the new inputs.

In the learning algorithm of the multilayer neural network, the weights of the synapses should be integers for the benefit of hardware construction, and the hard-limit function is used as the transfer function of neurons and its input and output is carried out as in binary numbers. It is a rule that unless the learning of the preceding layer is successful, the number of layers increases, and then the learning should be performed until the output value becomes identical to the desired output value. A multilayer neural network which is particularly suited for application to the present invention is described in U.S. patent application No. 08/112,019, filed concurrently herewith. Portions of that application are set forth below describing the multi-layer neural network and its operation.

Figure 9:
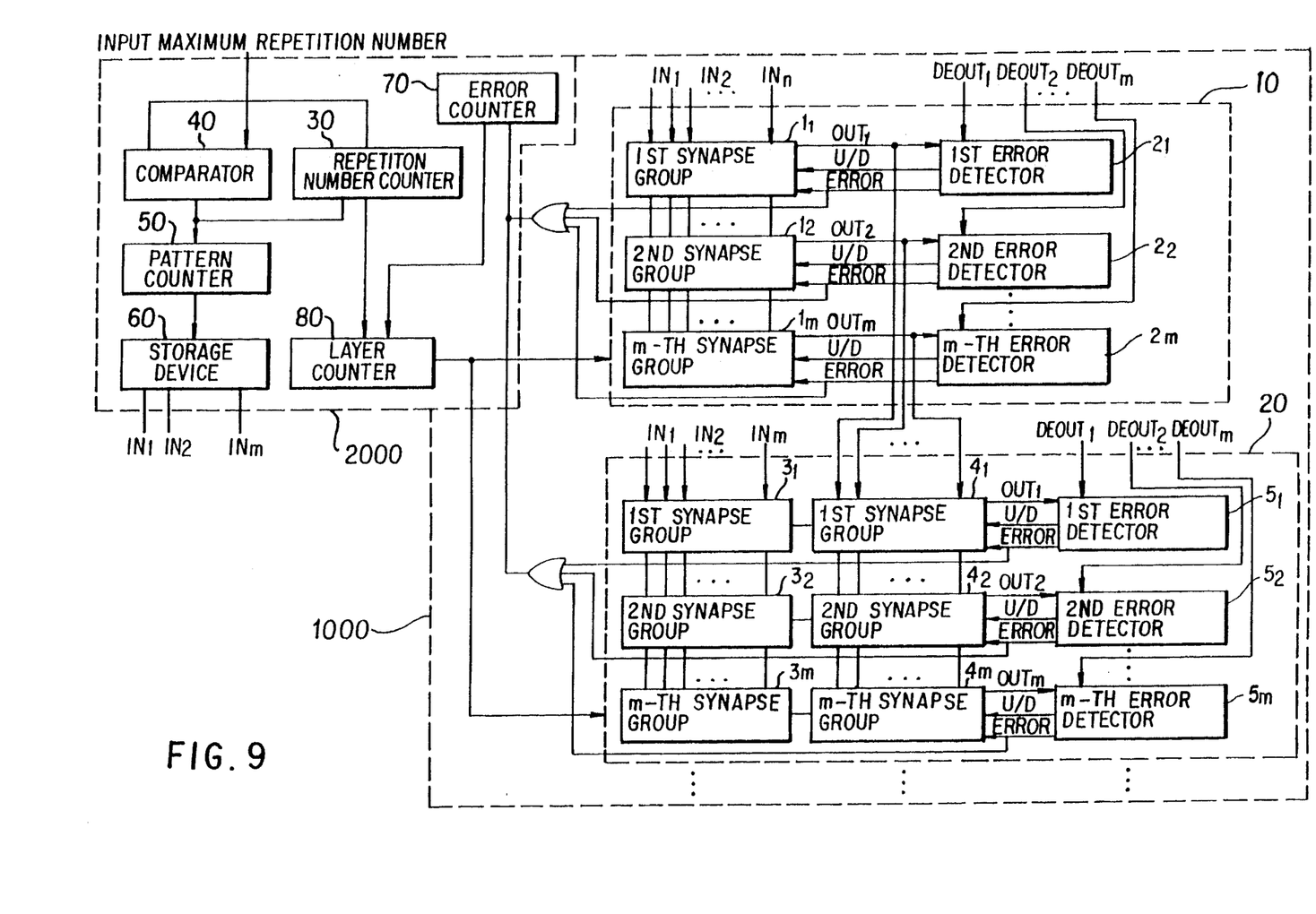
FIG. 9 is a block diagram of a self-learning multi-layer neural network.

FIG. 9 is a block diagram of a self-learning multi-layer neural network. In FIG. 9, a first-layer neural network comprises first through m-th synapse groups $1_1, 1_2, \ldots, 1_m$ which receives input signals $IN_1, IN_2, \ldots, IN_n$ and performs a learning or learning process according to the input signals $IN_1, IN_2, \ldots, IN_n$, so as to produce output signals $OUT_1, OUT_2, \ldots, OUT_m$, and first through m-th error detectors $2_1, 2_2, \ldots, 2_m$ which receives the output signals $OUT_1, OUT_2, \ldots, OUT_m$ of first through m-th synapse group $1_1, 1_2, \ldots, 1_m$ and desired output signals $DEOUT_1, DEOUT_2, \ldots, DEOUT_m$ to detect errors, and then generates signals for increasing or decreasing weight values in response to the detected error signals. A second-layer neural network 20 comprises first through m-th synapse groups $3_1, 3_2, \ldots, 3_m$ which receives the input signals $IN_1, IN_2, \ldots, IN_n$, (m+1)-th through (2m)-th synapse groups $4_1, 4_2, \ldots, 4_m$ which are connected in series to the first through m-th synapse groups $3_1, 3_2, \ldots, 3_m$ and which receives the output signals $OUT_1, OUT_2, \ldots, OUT_m$ of the first through m-th synapse groups $1_1, 1_2, \ldots, 1_m$, and first through m-th error detectors $5_1, 5_2, \ldots, 5_m$ which receives the output signals $OUT_1, OUT_2, \ldots, OUT_m$ of (m+1)-th through (2m)-th synapse groups $4_1, 4_2, \ldots, 4_m$ and desired output signals $DEOUT_1, DEOUT_2, \ldots, DEOUT_m$ to detect errors, and then generates signals for increasing or decreasing weight values in response to the detected error signals.

Also, referring to FIG. 9, a predetermined number of layers each of which has the same structure as that of second-layer neural network 20 forms a multi-layer neural network 1000, together with first-layer and second-layer neural networks 10 and 20.

Also, referring to FIG. 9, a controller 2000 for controlling multi-layer neural network 100 comprises a repetition number counter 30 for repetitively learning patterns which are input to multi-layer neural network 100, by a predetermined number of time, a comparator 40 which compares the repetition number of repetition number counter 30 with an input maximum repetition number and then resets repetition number counter 30 for performing a learning in a next layer when a repetitive learning is performed by the input maximum repetition number, a pattern counter 50 for counting n pattern elements constituting a pattern when the output signal of comparator 40 represents that the learning is not performed by the input maximum repetition number, storage means 60 for supplying the input patterns to the multi-layer neural network 100 in response to the output signals of pattern counter 50, an error counter 70 for counting how many error are generated in the result of learning of the n pattern elements in multi-layer neural network 100, and completing the learning when the error is not generated, and a layer counter 80 which receives the output signal of repetition number counter 30 and the output signal of error counter 70 and increases a layer for continuing the learning when the error is generated even though the learning is performed by the input maximum repetition number.

In the FIG. 9 constitution, the counters can be constituted as a predetermined number of flip-flops, the storage means as a memory device, and the comparator as a predetermined number of exclusive-OR gates. Also, the FIG. 9 constitution can be embodied into a single chip, thereby enabling a learning in a single chip.

The self-learning multi-layer neural network can, for example, perform the operation of an exclusive-OR gate. In this case, if four 2-bit input patterns and four 1-bit output patterns, and a repetition number are given by the user, the self-learning multi-layer neural network performs a self-learning itself to thereby constitute a neural network for performing an exclusive-OR operation.

Figure 10:
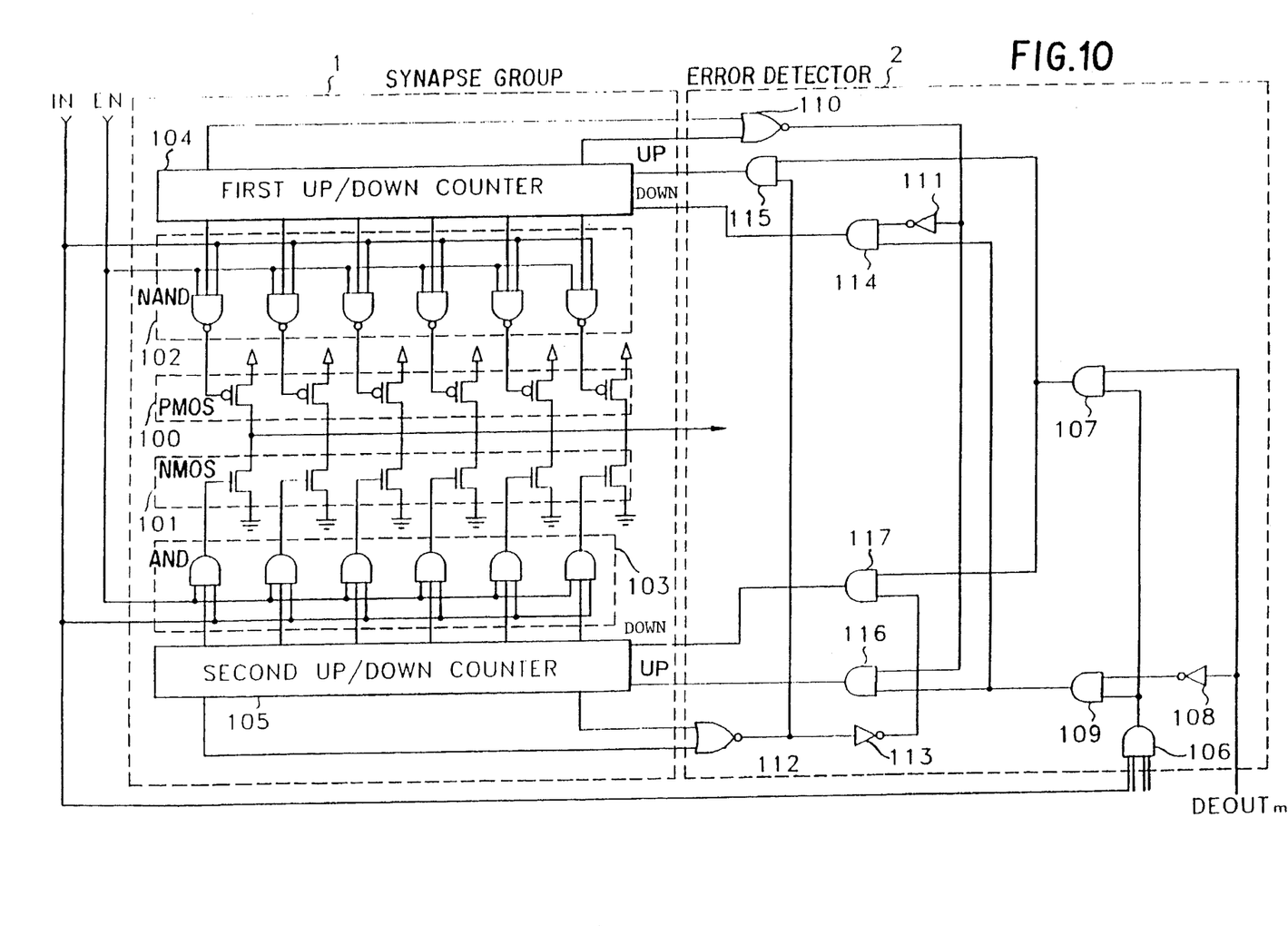
FIG. 10 is a detailed circuit diagram of one embodiment of a group of synapse and an error detector shown in FIG. 9.

FIG. 10 is a detailed circuit diagram of one embodiment of a group of synapse and an error detector shown in FIG. 9.

In FIG. 10, a group of synapse 1 comprises synapse PMOS transistors 100 having respective different weight values, each of which the source electrode is connected to a power supply voltage and the gate electrode is connected to a control signal input terminal, thereby functioning as excitatory, synapse NMOS transistors 101 each of which the drain electrode is connected to each drain electrode of synapse PMOS transistors 100, the source electrode is connected to a ground voltage and the gate electrode is connected to a control signal input terminal, thereby functioning as inhibitory, NAND gates 102 which receive an input signal IN and an enable signal EN and generate first control signals for controlling the respective gate electrodes of synapse PMOS transistors 100, AND gates 103 which receive input signal IN and enable signal EN and generate second control signals for controlling the respective gate electrodes of synapse NMOS transistors 101, a first up/down counter 104 which supplies the output signals thereof to input terminals of respective NAND gates 102 for increasing or decreasing the respective weight values of synapse PMOS transistors 100 and a second up/down counter 105 which supplies the output signals thereof to input terminals of respective AND gates 103 for increasing or decreasing the respective weight values of synapse NMOS transistors 101.

The error detector 2 comprises an AND gate 106 which receives input signal IN, the output signals A and B of error counter 70 and repetition number counter 30, and an error value C generated when the output signal $OUT_m$ of the synapse groups is not equal to the desired output signal $DEOUT_m$ by comparing the former with the latter, so as to be logically multiplied an AND gate 107 receives the desired output signal $DEOUT_m$ and the output signal of AND gate 106, so as to be logically multiplied an inverter 108 for inverting the desired output signal, an AND gate 109 which receives the output signals of inverter 108 and AND gate 106. So as to be logically multiplied, a NOR gate 110 which receives the most significant bit and the least significant bit of first up/down counter 104 so as to be logically operated, a NOR gate 112 which receives the most significant bit and the least significant bit of second up/down counter 105 so as to be logically operated, an AND gate 114 which receives the output signal of an inverter 111 for inverting the output of NOR gate 110 and the output signal of AND gate 109 to generate a signal for down-counting first up/down counter 104, an AND gate 115 which receives the output signals of AND gate 107 and NOR gate 112 to generate a signal for up-counting first up/down counter 104, an AND gate 116 which receives the output signals of AND gate 109 and NOR gate 110 to generate a signal for up-counting second up/down counter 105, and an AND gate 117 which receives the output signals of inverter 113 and AND gate 107 to generate a signal for down-counting second up/down counter 105.

Figure 11:
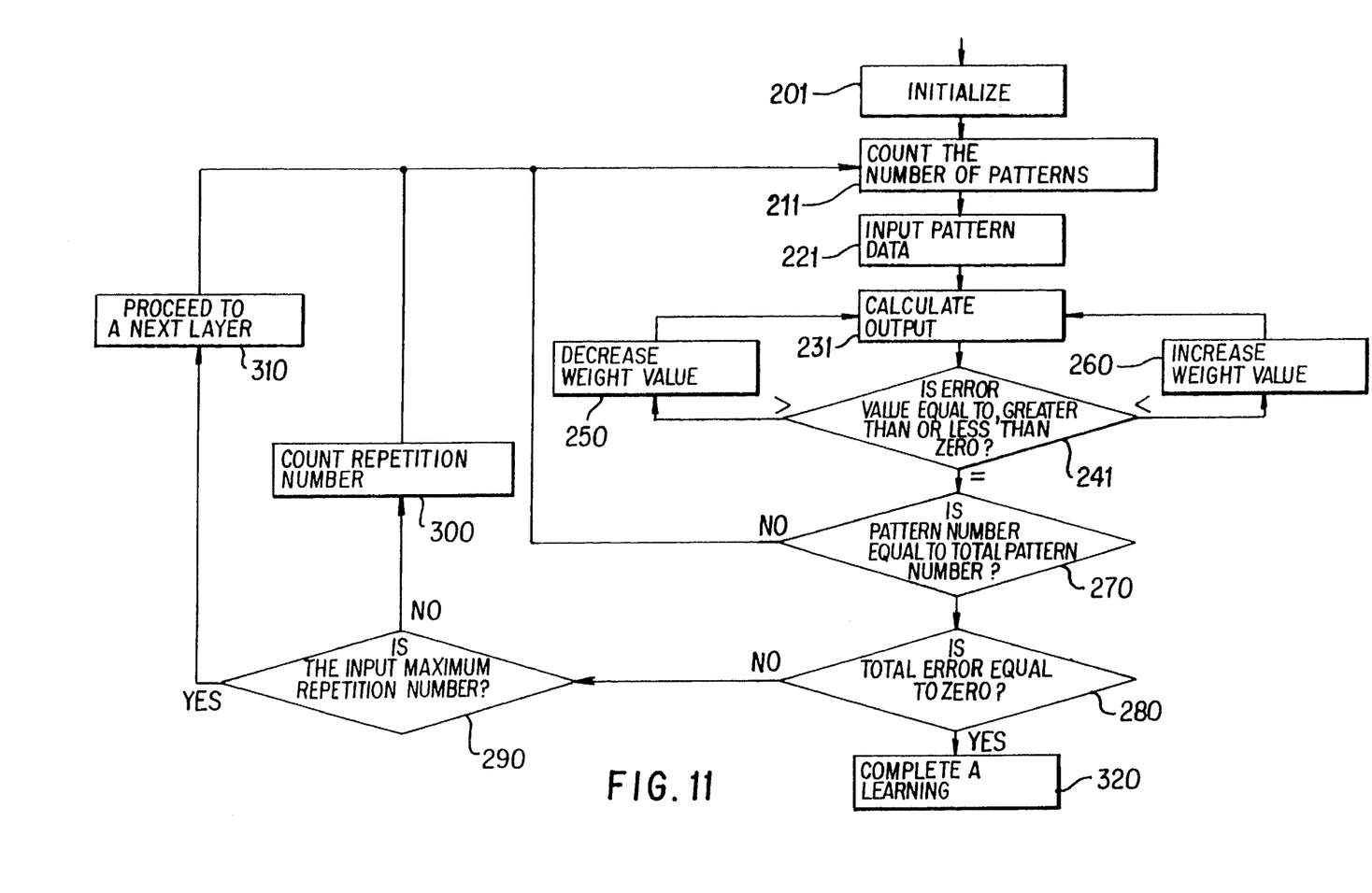
FIG. 11 is a flowchart for explaining an operation of the circuit shown in FIGS. 9 and 10.

FIG. 11 is a flowchart for explaining an operation of the circuit shown in FIGS. 9 and 10.

In step 201, the system is initialized. In this step, the weight values of the synapse are zero, the input patterns and the output patterns having the m pattern elements, and the input maximum repetition number are given.

In step 211, repetition number counter 30 counts the repetition number, and comparator 40 compares the input maximum repetition with the output signal of repetition number counter 30, to check if both are identical to each other. Then, if the output signal of comparator 40 represents that both compared signals are not same, pattern counter 50 counts the number of the patterns.

In step 221, the m pattern elements are read out from storage means 60 in sequence in response to the output signal of pattern counter 50, so as to be supplied to the multi-layer neural network.

In step 231, the first-layer neural network receives the output signal of the storage means to perform a learning.

In step 241, the error detector detects if the error value obtained by subtracting the output pattern value from the desired output pattern value equal to, greater than or less than zero.

When the error value is greater than zero in step 241, the learning is performed while the weight value of the first-layer neural network is decreased in step 250.

When the error value is less than zero in step 241, the learning is performed while the weight value of the first-layer neural network is increased in step 260.

When the error value is zero in step 241, it is judged that pattern counter 50 counts the total number of the patterns in step 270. If pattern counter 50 does not count the total number of the patterns in step 270, the system moves to step 211 to further count the number of the patterns.

When the total number of the patterns has been counted in step 270, it is judged if the total error is zero after all the patterns have been learned in step 280.

When the total error is not zero in step 280, it is judged if repetition number counter 30 counts the input maximum repetition number in step 290.

When the input maximum repetition number is not counted in step 290, the repetition number is further counted in step 300.

When the input maximum repetition number is counted in step 290, the system moves the learning from the first-layer neural network to the second neural network in steps 211 through 280, to repeat the steps 211 through 280. When the error value is zero in step 280, the learning is completed in step 320.

The foregoing describes a neural network invented by Ho-sun Chung and Kyung-hun Lee described in U.S. application Ser. No. 08/112,019, filed concurrently herewith, utilized in the preferred embodiment of the present invention.

The present invention which, in a preferred embodiment utilizes the above-described neural network, will now be described in detail.

Figure 1:
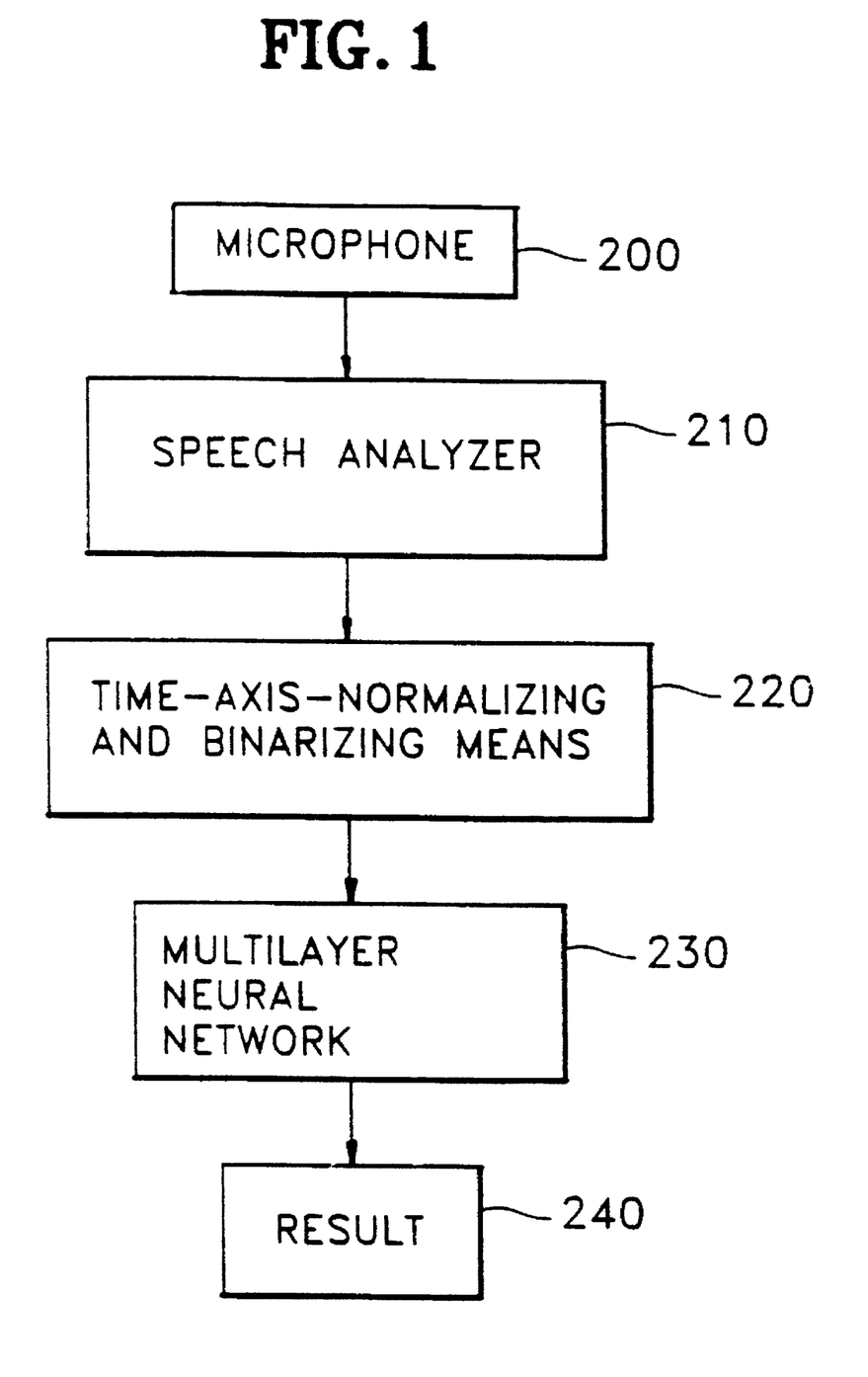
FIG. 1 is a block diagram showing a remote-control command recognition system for household electrical appliances, which uses a multilayer neural network, according to the present invention.

FIG. 1 is a block diagram illustrating a remote-control command recognition system for use with, for example, household electrical appliances, adopting a multilayer neural network according to the present invention. Referring to FIG. 1, the system comprises a microphone 200 for receiving speech, a speech analyzer 210 for extracting the characteristics of speech passed through microphone 200, means 220 for detecting the vocal section of speech processed through speech analyzer 210 and performing the time-axis normalization and the binarization thereto, and a multilayer neural network 230 for receiving the binarization data from means 220, performing the learning, and then outputting the speech recognition result.

A remote controller according to the present invention is comprised as shown in FIG. 1. The remote controller transmits a remote-control signal corresponding to the recognized speech, to thereby direct the household electrical appliances to operate. Also, the recognized speech signal is displayed on a screen (not shown).

Figure 2:
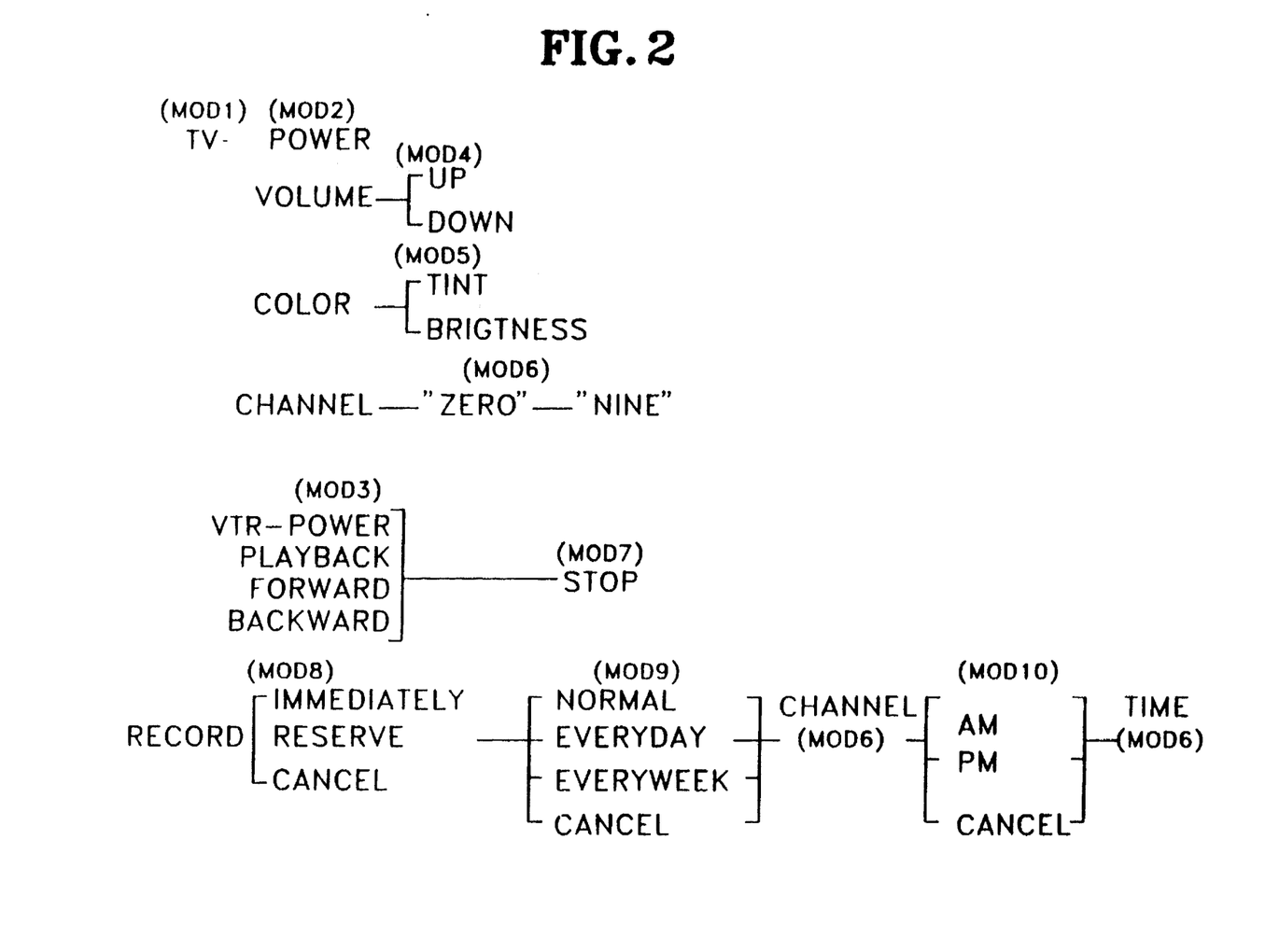
FIG. 2 shows the recognition target words used in the recognition experiment according to the present invention.

FIG. 2 lists the recognition target words used in an experiment of the present invention. Referring to FIG. 2, the recognition target words are composed of 23 TV and VCR commands and Korean numbers/young/to/koo/, which represent "one" to "nine" in English, respectively.

Figure 3:
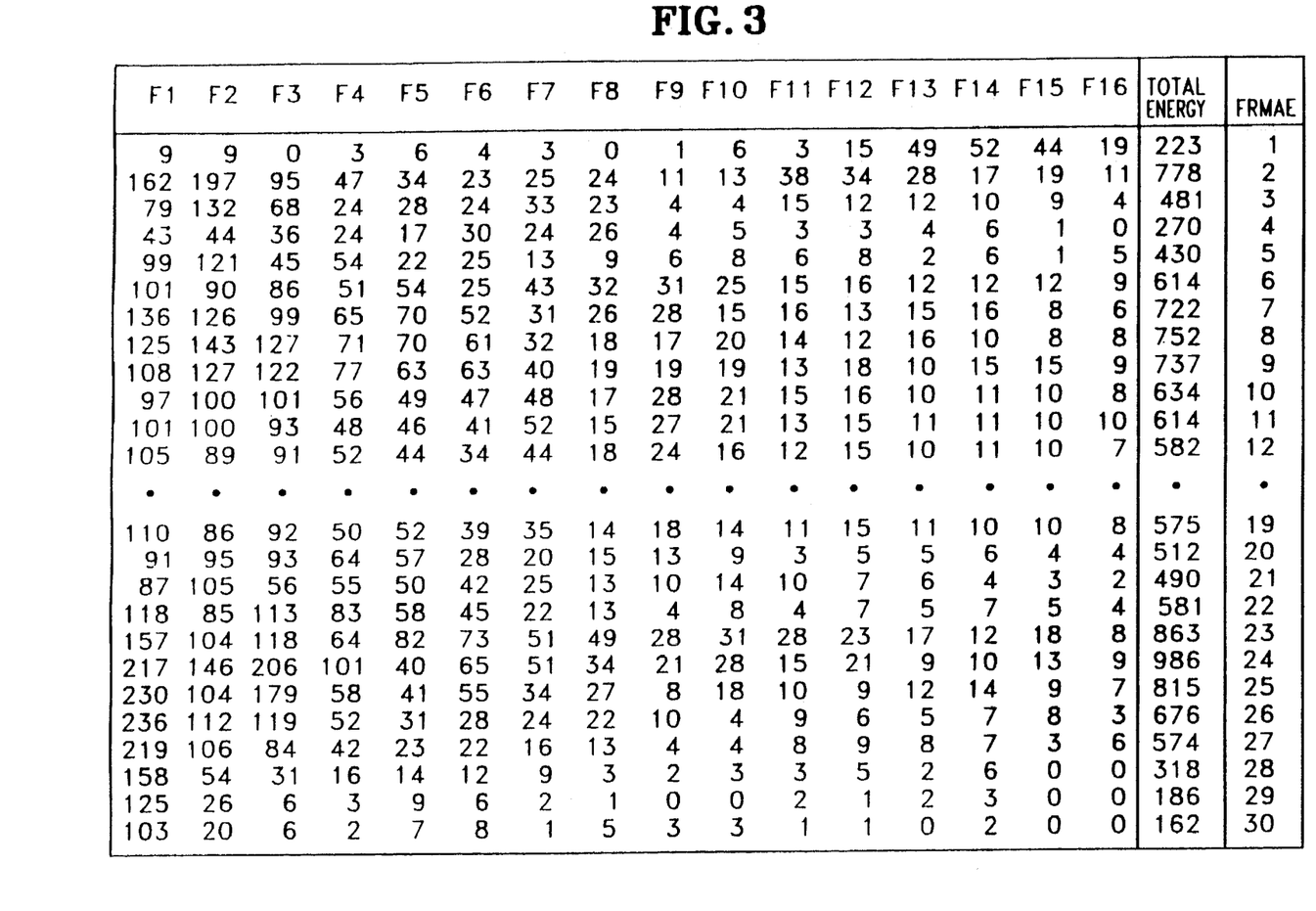
FIG. 3 shows the data obtained after detecting the voice section of a recognition target word "power"

FIG. 3 is a table showing the data after detecting the vocal section in a recognition target word "power."

The present invention uses the output of a sixteen-channel band filter bank so that the vocal section is divided into sixteen frequency bands F1–F16. The analyzation period of the speech data is set to 16 ms. From the analyzed data, the frame which exhibits higher energy level than the predetermined threshold value is detected, so that these continuous frames are grouped as the vocal section.

Since even the same word can be pronounced slightly longer or shorter, vocal-section-detected data is time-axis-normalized in every 30 frames which correspond to the average duration of dissyllable or trisyllable word. The normalization is carried out by proportionally deleting parts of frames of a word if the word is larger than the reference frame, and proportionally copying the parts of frame if the word is shorter than the reference frame.

Figure 4A:
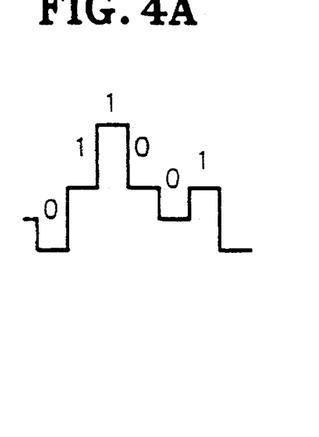
FIGS. 4A–4C are diagrams illustrating binarization methods according to the present invention.
Figure 4B:
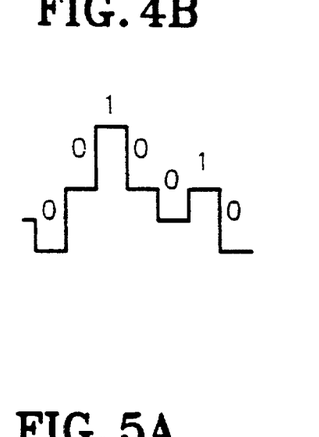
Figure 4C:
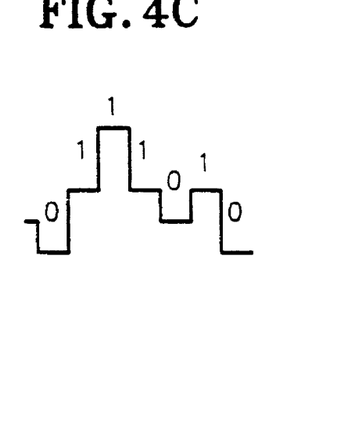

FIGS. 4A through 4C show the method for binarization according to the present invention. Referring to FIG. 4A, assume that two neighboring frequency bands are a first and a second frequency band, respectively, and if an energy level of the first frequency band is greater than that of the second frequency band which neighbors with the first frequency band, value "1" is assigned to the first frequency band, or value "0" is assigned to the second frequency band. Referring to FIG. 4B, if the energy level of a frequency band is greater than those of its two neighboring frequency bands between which said frequency band is positioned, value "1" is assigned to the frequency band, or value "0" is assigned to the frequency band. Referring to FIG. 4C, the data which is divided into a vocal section is normalized at a fixed proportion, and if the energy level of a frequency band is larger than the predetermined threshold value, value "1" is assigned to the frequency band, or value "0" is assigned to the frequency band.

Figure 5A:
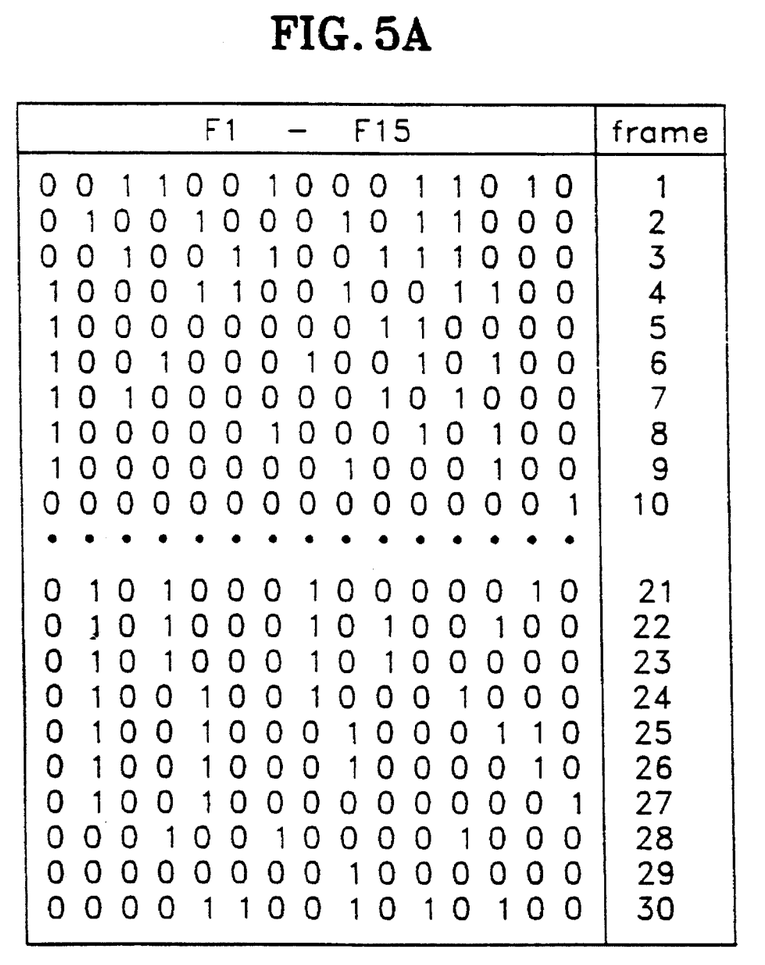
FIG. 5A is a table showing a result obtained by binarizing the data shown in FIG. 3, according to the method illustrated in FIG. 4A.

FIG. 5A is a table showing the result obtained by the binarization of the data of FIG. 3, using the method illustrated in FIG. 4A.

Figure 5B:
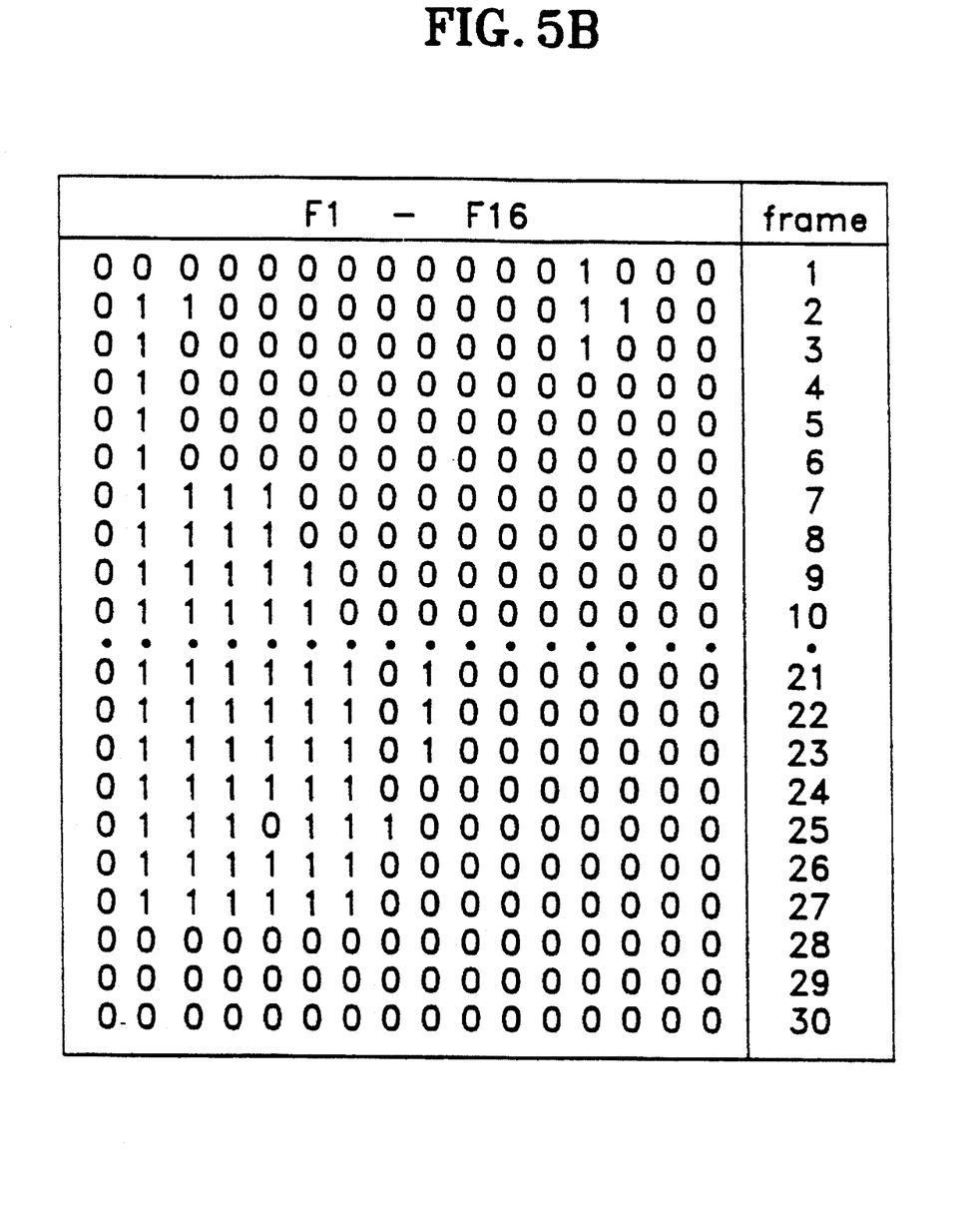
FIG. 5B is a table showing a result obtained by binarizing the data shown in FIG. 3, according to the method illustrated in FIG. 4C.

FIG. 5B is a table showing the result obtained by the binarization of the data of FIG. 3, using the method illustrated in FIG. 4C.

The binarization result of FIGS. 5A and 5B are used as the inputs to a multilayer neural network. The multilayer neural network performs the above-described algorithm by receiving the binarized results.

Figure 6:
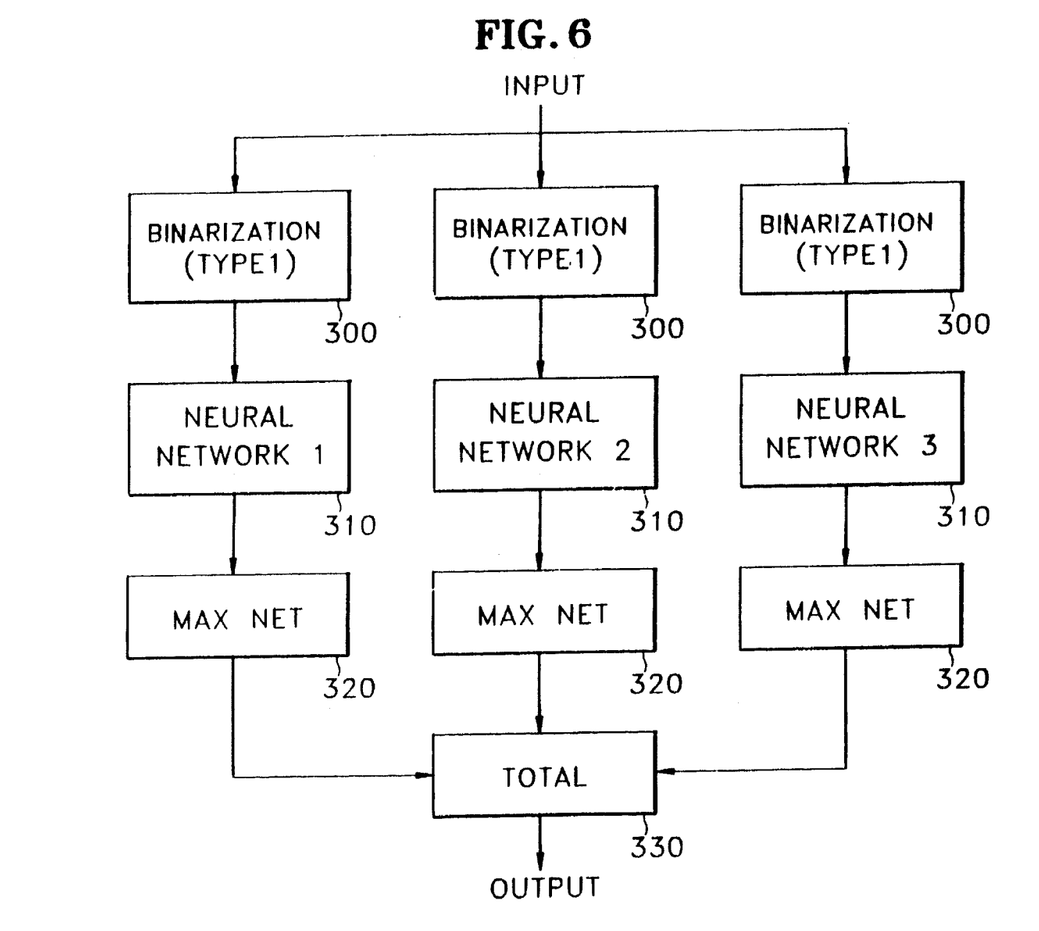
FIG. 6 is a block diagram illustrating the sequence of the processing of data which is speech-section-detected and time-axis-normalized, according to the present invention.

FIG. 6 is a block diagram illustrating the sequence in that the vocal-section-detected and time-axis-normalized data are processed. Referring to FIG. 6, the vocal-section-detected and time-axis-normalized data are binarized by three types of binarization circuits 300. Next, the binarized data is processed through learning by means of three multilayer neural networks 310, respectively. The data obtained by the learning enter each of maximum-value outputting circuits 320, respectively, therefore the maximum values are produced. Then, the results of maximum-value outputting circuits 320 are integrated by a final-value recognition circuit 330, the final-value recognition circuit produces the ultimately recognized value.

Here, by using three different types of binarization methods at the same time, the characteristics of the speech can be expressed more distinctly, to thereby secure better recognition ratio therefor.

Further, the present invention provides another method for obtaining more preferable learning result.

Figure 7:
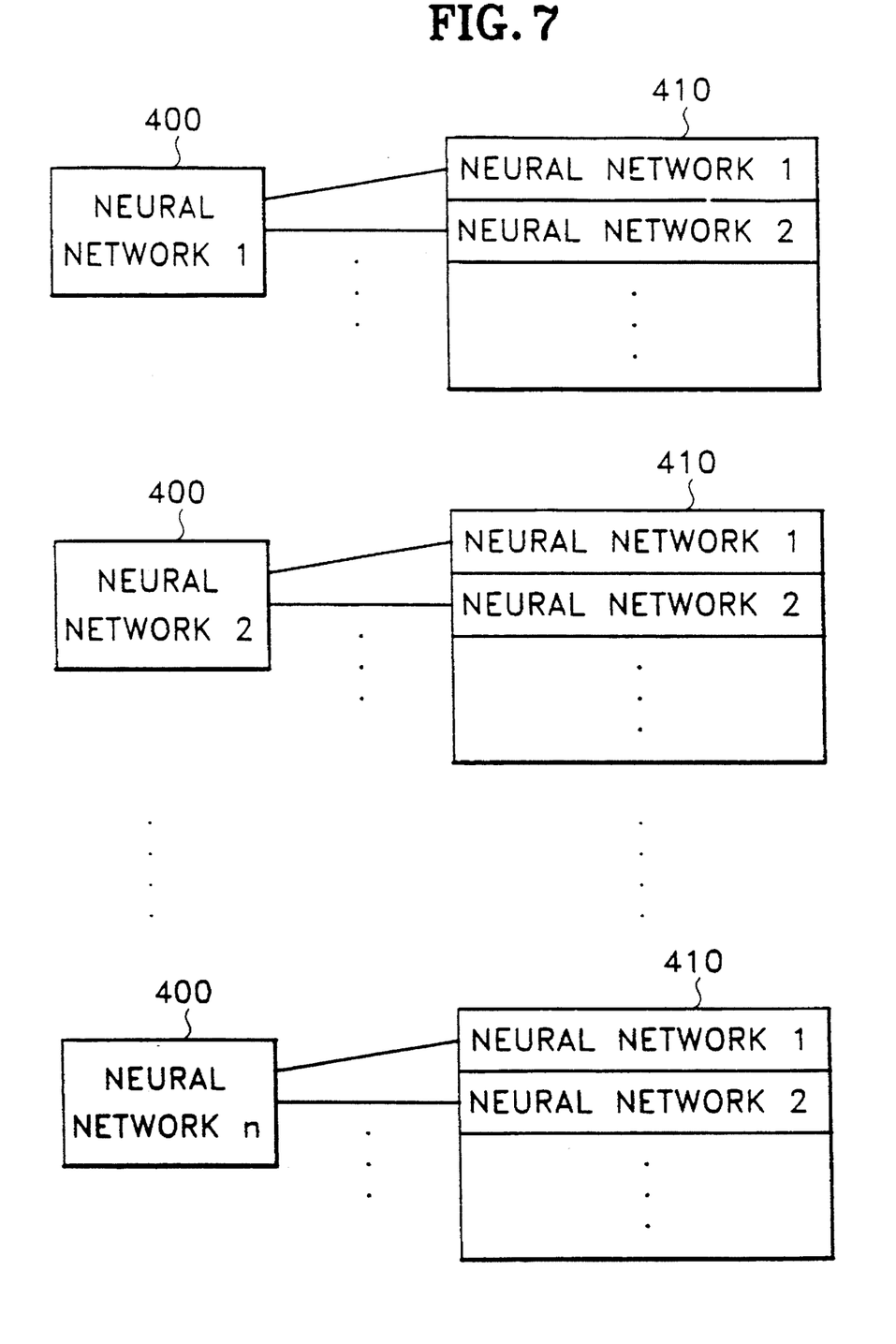
FIG. 7 shows a learning method of a multilayer neural network for enhancing the recognition ratio of the speech recognition system according to the present invention.

FIG. 7 shows a learning method for exhibiting a more preferable result, according to the present invention. Referring to FIG. 7, one multilayer neural network comprises a predetermined number of sub-neural networks, and each of sub-neural networks further comprises its own sub-neural networks, which can thereby enhance the recognition ratio. The speech recognition system according to the present invention comprises a plurality of neural networks 400 for performing the learning by receiving the binarized signals and a plurality of sub-neural networks 410 which are connected to neural networks 400. Also, the sub-neural networks can include their own sub-neural networks.

In order words, the outputs which cannot be determined by the neural networks can be learned by sub-neural networks 410, thereby the final result is obtained. The outputs which cannot by determined by the sub-neural networks 410 can be learned by their own sub-neural networks. For instance, when performing the learning with respect to Korean numbers/il/ and /chil/, /sahm/ and /pahl/, and /yuk/ and /koo/ each pair of which seem similar each other and is difficult to tell one from the other, those pairs of numbers can be learned one more time. This method is introduced by the present invention, to enhance the recognition ratio in the learning.

Figure 8:
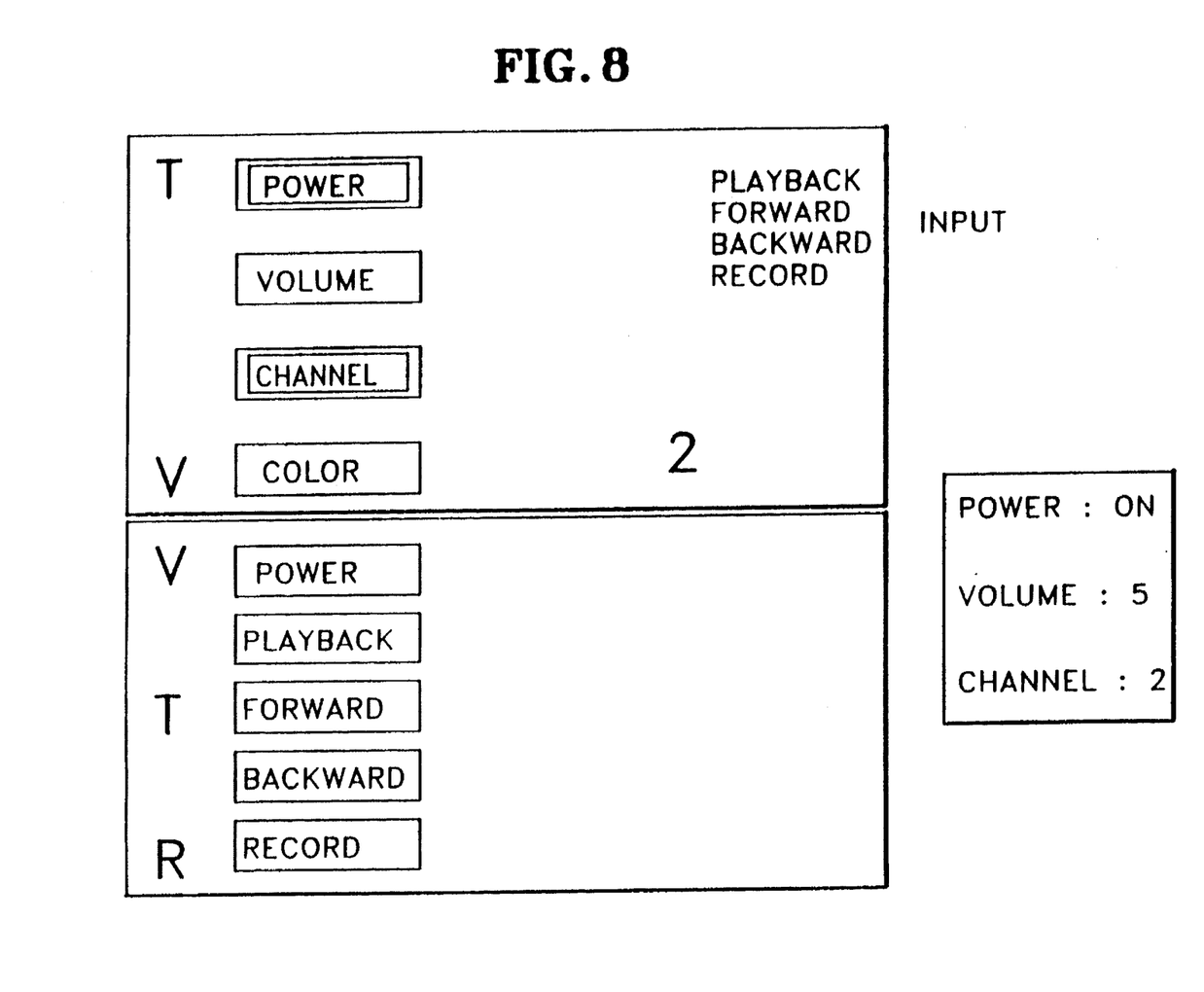
FIG. 8 shows a result obtained by a software simulation of speech recognition with respect to TV and VCR commands.

FIG. 8 shows a software simulation of TV and VCR commands, which is displayed on the monitor of a computer system. At this moment, the study data for the multilayer neural network employs 300 data or more for each module which is pronounced by a speaker, and totals ten modules. The time lapse necessary for the recognition is about 0.2 seconds, which facilitates a real-time system. After the learning, the study data exhibited 100% recognition ratio, and the test data exhibited 90% recognition ratio, which is perceived to be a high ratio.

Accordingly, the speech recognition system and speech recognition method therefor according to the present invention can improve the recognition ratio of speech.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A speech recognition system comprising:

a) a microphone for receiving speech pronounced by a user;

b) speech analyzing means for analyzing the speech input via said microphone;

c) normalizing and binarizing means for detecting a vocal section of the speech received from the speech analyzing means and for performing a time axis normalization and binarization for said vocal section, said normalizing and binarizing means including first means for, if the output of a first frequency band in said vocal section and time-axis-normalized data is greater than that of a second frequency band which neighbors with said first frequency band, assigning a first state value to said first frequency band, else assigning a second state value to said first frequency band, second means for, if the output of a first frequency band in said vocal-section-detected and time-axis-normalized data is greater than those of its neighboring frequency bands between which said first frequency band is positioned, assigning the first state value to said first frequency band, else assigning the second state value to said first frequency band, and third means for normalizing said vocal-section-detected and time-axis-normalized data at a predetermined proportion, and if an output value of a frequency band is greater than a threshold value assigning the first state value to said frequency band, else assigning the second state value to said frequency band; and d) a multilayer neural network for receiving the binarization data from said normalizing and binarizing means, then performing a learning, to thereby output a speech recognition result.

2. The speech recognition system as claimed in claim 1, wherein said multilayer neural network comprises first, second and third multilayer neural networks each of which is connected to said first, second and third means, respectively.

3. The speech recognition system as claimed in claim 2, wherein each of said first, second and third multilayer neural networks comprises a predetermined number of sub-neural networks.

4. A method for learning spoken commands for use with a speech recognition system having a microphone for receiving speech pronounced by a user, a speech analyzer for analyzing the speech input via the microphone, normalizing and binarizing means for detecting a vocal section of the speech received from the speech analyzing means and for performing a time axis normalization and binarization for said vocal section; and a multilayer neural network for receiving the binarization data from the normalizing and binarizing means, the method comprising the steps of:

(a) detecting a vocal section of the speech and performing a time axis normalization and binarization for said vocal section, said normalization and binarization including the steps of if the output of a first frequency band in said vocal section and time-axis-normalized data is greater than that of a second frequency band which neighbors with said first frequency band, then assigning a first state value to said first frequency band, else assigning a second state value to said first frequency band;

if the output of a first frequency band in said vocal section-detected and time-axis-normalized data is greater than those of its neighboring frequency bands between which said first frequency band is positioned, then assigning the first state value to said first frequency band, else assigning the second state value to said first frequency band;

normalizing said vocal-section-detected and time-axis-normalized data at a predetermined proportion, and then if an output value of a frequency band is greater than a threshold value then assigning the first state value to said frequency band, else assigning the second state value to said frequency band;

(b) initializing the weights of all nodes in the multilayer neural network;

(c) receiving the values of input and its corresponding output values;

(d) summing up the multiplications of input by weights at every node, to thereby produce an output by using a hard-limit non-linear function;

(e) comparing the output of the multilayer neural network with the desired output value, to thereby calculate the error between the output and the corresponding output values, and then determining the weight change according to the error values and storing the new weight value;

(f) performing said steps(c) through (e) with respect to all desired inputs, then if all of the output values are identical to the desired values, stopping the learning, otherwise adding the sums of weight changes to each of said weights, respectively; and (g) repeating said steps (c) through (f) a predetermined number of times, then unless the desired result is obtained, increasing the number of layers, afterwards repeating said steps (c) through (f) while receiving the output from the preceding layer and the initial input as the new inputs.

5. A speech recognition system comprising:

a) a microphone for receiving speech pronounced by a user;

b) a speech analyzer coupled to said microphone to receive the speech pronounced by a user for extracting the characteristics of the speech;

c) normalizing and binarizing means, coupled to said speech analyzer, for detecting a vocal section of the speech received from the speech analyzer and for performing time axis normalization and binarization for said vocal section, said normalizing and binarizing means further including first means for determining if the output of a first frequency band in said vocal section and time-axis-normalized data is greater than that of a second frequency band which neighbors with said first frequency band, then assigning a first state value to said first frequency band, else assigning a second state value to said first frequency band, second means for determining if the output of a first frequency band in said vocal-section-detected and time-axis-normalized data is greater than those of its neighboring frequency bands between which said first frequency band is positioned, then assigning the first state value to said first frequency band, else assigning the second state value to said first frequency band, and third means for normalizing said vocal-section-detected and time-axis-normalized data at a predetermined proportion, and then if an output value of a frequency band is greater than a threshold value, then assigning the first state value to said frequency band, else assigning the second state value to said frequency band; and d) a multilayer neural network including first second and third multilayer neural networks each of which is connected to said first, second and third means respectively to receive the binarization data and then perform a learning, to thereby output a speech recognition result.

* * * * *